United States Patent
Hery

(10) Patent No.: US 12,396,462 B2
(45) Date of Patent: *Aug. 26, 2025

(54) CONCENTRATED EXTRACT OF ALGAE, PRODUCTION METHOD THEREOF AND USE OF SAME IN AGRICULTURE

(71) Applicant: Laboratoires Goemar, Saint Malo (FR)

(72) Inventor: Paul Hery, Dol de Bretagne (FR)

(73) Assignee: LABORATOIRES GOEMAR, Saint Malo (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,794

(22) Filed: Sep. 30, 2021

(65) Prior Publication Data
US 2022/0015376 A1    Jan. 20, 2022

Related U.S. Application Data

(62) Division of application No. 15/510,538, filed as application No. PCT/FR2015/052439 on Sep. 11, 2015.

(30) Foreign Application Priority Data

Sep. 11, 2014  (FR) ...................... 14/58561

(51) Int. Cl.
    *A01N 65/03*    (2009.01)
(52) U.S. Cl.
    CPC .................. *A01N 65/03* (2013.01)
(58) Field of Classification Search
    CPC .................................................... A01N 65/03
    See application file for complete search history.

(56) References Cited

U.S. PATENT DOCUMENTS

| | | | |
|---|---|---|---|
| 4,897,266 A | 1/1990 | Herve et al. | |
| 5,508,033 A | 4/1996 | Briand | |
| 6,312,709 B1 | 11/2001 | Allen et al. | |
| 6,346,252 B1 | 2/2002 | Moigne | |
| 6,841,572 B2 | 1/2005 | Horst et al. | |
| 8,815,570 B2 | 8/2014 | Weber et al. | |
| 9,854,810 B2 | 1/2018 | Meeder | |
| 2004/0011101 A1 | 1/2004 | Newton et al. | |
| 2005/0048080 A1 | 3/2005 | Katzen | |
| 2011/0020881 A1 | 1/2011 | Cho et al. | |
| 2011/0142875 A1 | 6/2011 | Piccirilli | |
| 2012/0302742 A1 | 11/2012 | Hjelland et al. | |
| 2015/0351408 A1 | 12/2015 | Meeder | |
| 2017/0251677 A1 | 9/2017 | Hery | |
| 2022/0015374 A1 | 1/2022 | Hery | |
| 2022/0015375 A1 * | 1/2022 | Hery | A01N 65/03 |
| 2022/0361435 A1 | 11/2022 | Mery et al. | |

FOREIGN PATENT DOCUMENTS

| | | | | |
|---|---|---|---|---|
| CN | 1669441 A | 9/2005 | | |
| EP | 0538091 A1 | 1/1996 | | |
| ES | 2150275 T3 | 11/2000 | | |
| JP | 2008120707 A | 5/2008 | | |
| KR | 984217 B1 * | 9/2010 | ............. | A01N 25/30 |
| KR | 100984217 B1 | 9/2010 | | |
| RU | 2308203 C1 * | 10/2007 | | |
| WO | 8402652 A1 | 7/1984 | | |
| WO | 9107946 A1 | 6/1991 | | |
| WO | WO-0209513 A2 * | 2/2002 | ............. | A01N 37/06 |
| WO | 2013120729 A1 | 8/2013 | | |
| WO | 2015011411 A1 | 1/2015 | | |

OTHER PUBLICATIONS

International Search Report and Written Opinion for International Application PCT/FR2015/052439; International Filing Date: Sep. 11, 2015; Date of Mailing: Dec. 2, 2015; 9 pages.

Khan, et al.; "Seaweed extracts as biostimulants of plant growth and development"; Journal of Plant Growth Regulation vol. 28, Issue No. 4; 2009; pp. 386-399.

Offei, F, et al.; "Seaweed Bioethanol Production: A Process Selection Review on Hydrolysis and Fermentation"; Fermentation, vol. 4, Issue No. 4, 99; 2018; 18 pages; DOI: https://doi.org/10.3390/fermentation4040099.

Stadnik et al.; "Algal polysaccharides as source of plant resistance inducers"; Tropical Plant Pathology, vol. 39, Issue No. 2; 2014; pp. 111-118.

Anonymous; "Acadian 100% Soluble Seaweed Extract Powder" [Product Sheet]; Organic Crop Protectants Pty LTD; retrieved on Aug. 11, 2022 from "https://ocp.com.au/wp-content/uploads/2021/03/Acadian-Seaweed-Powder-Flyer-1.pdf"; 2 pages.

Pereira, L. et al.; "Introductory Chapter: Alginates—A General Overview"; IntechOpen; 2020; 17 pages; DOI: 10.5772/intechopen.88381.

Schiener, P. et al.; "The seasonal variation in the chemical composition of the kelp species *Laminaria digitata, Laminaria hyperborea, Saccharina latissima* and *Alaria esculenta*"; Journal of Applied Phycology, vol. 27; 2015; pp. 363-373; DOI: https://doi.org/10.1007/s10811-014-0327-1.

(Continued)

*Primary Examiner* — Bethany P Barham
*Assistant Examiner* — Danielle Johnson
(74) *Attorney, Agent, or Firm* — CANTOR COLBURN LLP

(57) ABSTRACT

The present invention relates to a concentrated algal extract having a percentage dry matter of between 6 and 100%, the preparation process thereof and also the uses thereof alone or combined with another nutritive, biostimulating or plant-protecting technology, especially to promote plant emergence, growth, development and reproduction and to prevent birds from eating the seeds. The invention also targets a process for applying the concentrated algal extract of the present invention, and also a seed coated with said extract.

5 Claims, 1 Drawing Sheet

(56) References Cited

OTHER PUBLICATIONS

Shanmugam, H. et al.; "Algal Biotechnology: An Update From Industrial and Medical Point of View"; Omics Technologies and Bio-engineering: Towards Improving Quality of Life, Chapter 3; 2018; pp. 31-52; DOI: https://doi.org/10.1016/B978-0-12-815870-8.00003-6.

Anonymous; "Algifert-K-Powder" [Product Info]; Humos Manufactuing LTD; May 1, 2018; Retrieved on Apr. 13, 2023 from "https://www.humefert.com/wp-content/uploads/2018/05/tds-algifert-k-powder.pdf"; 1 page.

Escanilla, R.; "Business plan for the manufacture and commercialization of a biological fertilizer based on marine algae"; University of Chile, Undergraduate Thesis; 2006; 68 pages; URI: https://repositorio.uchile.cl/handle/2250/108388; with English Abstract.

Perez, B.; "Application of Hyperspectral Remote Sensing Techniques in Vineyard Fertilized with Extract of Seaweed"; Final Degree Project, University of Valladolid, available online at "https://docplayer.es/15470321-Universidad-de-valladolid.html"; 2004; 135 pages; with English Abstract.

Yuan, Y.; "Important Chemical Products from Magroalgae (*Ascopyllum nodosum*) Biorefinery by Assistance of Microwave Technology"; Dissertation, Doctor of Philosophy (Chemistry), University of New York; 2015; 196 pages.

Anonymous; "Calibra: Activator of fruit and leaf equality in Summerfruit" [Datasheet]; Laboratoires Goemar SAS, New Zealand; 2014; 2 pages.

Anonymous; "Goemar Opti" [Datasheet]; Stahler from www.staehler.com; 2009; 6 pages.

Third Party Observations, EP Serial No. EP4041700, Application No. 20789656.4, dated Aug. 9, 2023.

Third Party Submission, U.S. Appl. No. 17/767,101, May 30, 2023.

Akash, et al.; Effect of different concentrations of commercial seaweed liquid extract of *Ascophyllum nodosum* (Organic Dews) as a plant bio stimulant on growth, yield and biochemical constituents of onion (*Allium cepa* L.): Journal of Pharmacognosy and Phytochemistry, vol. 6, Issue No. 4; 2017; pp. 658-663.

Anonymous; "TourTurf APS Algae Plus Seaweed, Oxide:2-0-1" [Product & Material Safety Data Sheet]; Germany; TourTurf; 2017; 8 pages.

Booth, B.; "The Manufacture and Properties of Liquid Seaweed Extracts"; Proceedings of the International Seaweed Symposium, vol. 6; 1969; 8 pages.

International Search Report and Written Opinion for International Application PCT/GB2020/052369; International Filing Date: Sep. 30, 2020; Date of Mailing: Jan. 12, 2021; 9 pages.

Craigie JS. Seaweed extract stimuli in plant science and agriculture. J Appl Phycol. 2011 ;23:371-393.

James DE. Culturing algae. Carolina Biological Supply Co. 1978;1-28.

Nieber et al. Maintenance for Infiltration Practices. Maintenance for Infiltration Practices | Stormwater Treatment: Assessment andMaintenance. 2019;1-3.

Taulbee et al., Centrifugation Preparative., In Encyclopedia of Analytical Science, 2nd ed; Elsevier: Amsterdam, The Netherlands, 2005; 469-481.

\* cited by examiner

CONCENTRATED EXTRACT OF ALGAE, PRODUCTION METHOD THEREOF AND USE OF SAME IN AGRICULTURE

CROSS-REFERENCE TO RELATED APPLICATIONS

This Application is a divisional of U.S. application Ser. No. 15/510,538, filed Mar. 10, 2017, which is a U.S. national phase of International Application No. PCT/FR2015/052439, filed Sep. 11, 2015, which claims priority from French Patent application no. FR1458561, filed Sep. 11, 2014, the disclosure of each of which is incorporated by reference in its entirety.

FIELD OF THE INVENTION

The present invention relates to a concentrated algal extract having a percentage dry matter of between 6 and 100%, the preparation process thereof and also the uses thereof alone or combined with another nutritive, biostimulating or plant-protecting technology, especially to promote plant emergence, growth, development and reproduction and to prevent birds from eating the seeds. The invention also targets a process for applying the concentrated algal extract of the present invention, and also a seed coated with said extract.

BACKGROUND

Increase in yields is a central preoccupation for farmers. Yield largely depends on the good development of the plant and consequently on its growth, as well as its good health.

Plant growth is directly linked to the absorption and assimilation of mineral elements as well as the flows of hormones governing the elongation and differentiation of plant tissues. Consequently, nutrients and hormones play an essential role in plant growth. Owing to their inability to move, plants have developed active and activatable mechanisms enabling them to make the best possible use of the available resources to promote their growth. Fertilizers are used in order to increase this growth.

Algae have been used for a number of years as organic enriching agent on various soil types and various market garden and cereal crops. Algal extracts are used as biostimulant, frequently sprayed onto the leaves of the plants. Numerous beneficial effects linked to the use of algal extracts in agriculture have been observed and include, especially, an increase in the yield, in the nutrient supply, in resistance to frost and to stress conditions, an improved period of preservation of fruits and a reduction in attacks by fungi and insects.

Algal extracts are also known to enable better seed germination, especially by promoting plant emergence. Indeed, as soon as they emerge, seedlings are sensitive to pathogenic microorganisms such as fungal species such as rhizoctonia root rot, pythium, or bacteria which cause a disease known as damping off. The young shoots which are attacked end up lying on their side, as if the base of the stem has been pinched. Air humidity and low temperatures promote the appearance of damping off.

SUMMARY

Numerous algal extracts are sold for their use in agriculture. For example, the applicant described, in patent EP 0538091, a composition derived from marine algae obtained according to a process comprising the following steps:
  a) basic hydrolysis of at least one brown alga in the presence of a reducing agent, at a temperature between 50 and 100° C., for a period of between 4 and 8 h;
  b) neutralization of the hydrolysate obtained in this way with a strong acid, until a pH of between 6 and 8 is obtained;
  c) filtration;
  d) optionally diafiltration or electrodialysis of the permeate obtained at the end of step c); and
  e) optionally reducing, to the powder thereof, the permeate obtained at the end of step c) or the retentate obtained at the end of step d).

Nonetheless, due to the basic hydrolysis of the alga under hot conditions in the presence of a reducing agent, some compounds of the intracellular fluid of the alga are not preserved, especially polysaccharides, lipids, proteins and polyphenols, which reduces the biostimulating properties of the composition obtained with the process described above.

The present inventors have found that an algal extract, in which the compounds of the intracellular fluid of the alga are preserved, had excellent biostimulating activity when it was concentrated to achieve a certain percentage dry matter. Surprisingly, the applicant has observed that, following application in comparable amounts, the concentrated algal extract of the invention is more effective than a diluted extract in stimulating plant emergence and promoting plant growth. Moreover, when the concentrated algal extract is used to coat seeds, the latter are less frequently attacked by birds than uncoated seeds.

A subject of the present invention is a concentrated algal extract having a percentage dry matter of between 6 and 100%, preferably between 9 and 70%, more preferentially between 12 and 50%, and containing 0 to 5%, in particular 1 to 4%, more particularly 2 to 3% by weight of alginate and/or of cellulose relative to the weight of said extract.

A second subject of the present invention is a process for preparing a concentrated algal extract according to the invention, comprising the following steps:
  grinding the algae until the cells rupture;
  homogenizing the ground algal material in aqueous solution;
  removing the alginate and the cellulose by flocculation and filtration;
  optionally adjusting the pH of the filtrate;
  concentrating the filtrate to reach a percentage dry matter of between 6 and 100%, preferably between 9 and 70%, more preferentially between 12 and 50%.

Another subject of the present invention is a process for promoting the emergence, growth, development and/or reproduction of a plant, characterized in that the extract according to the invention, or prepared according to the process of the invention, is applied by infiltration into the soil, sprayed onto the leaves of the plant, applied to a seed before sowing, or applied to the roots of a seedling, especially by dip treatment, before the planting thereof.

Yet another subject of the present invention is the use of an extract according to the invention, or prepared according to the process of the invention, to promote plant growth.

Another subject of the present invention is the use of an extract according to the invention, or prepared according to the process of the invention, to stimulate plant emergence.

A sixth subject of the present invention is the use of an extract according to the invention, or prepared according to the process of the invention, as bird repellent.

Finally, another subject of the invention is a seed coated with an extract according to the invention, or prepared according to the process of the invention.

DETAILED DESCRIPTION

The concentrated algal extract of the present invention is especially an aqueous extract or a dry extract, having a percentage dry matter of between 6 and 100%, preferably between 9 and 70%, more preferentially between 12 and 50%.

The percentage dry matter, within the meaning of the present invention, is calculated with the following formula:

$$\frac{m_{dry}}{m_{hydrated}} \times 100$$

in which
  $m_{dry}$ is the weight of matter remaining after drying; and
  $m_{hydrated}$ is the weight of the algal extract before drying.

The concentrated algal extract of the present invention does not contain alginate and/or cellulose. Thus, the algal extract according to the invention comprises algal intracellular fluid, obtained after rupturing the algal cell walls and removing them by flocculation. According to a particular embodiment, the concentrated algal extract of the present invention contains 0 to 5%, in particular 1 to 4%, more particularly 2 to 3% by weight of alginate and/or of cellulose relative to the weight of said extract.

The alga from which the concentrated extract of the present invention is obtained may especially be chosen from *Ascophyllum nodosum, Fucus vesiculosus, Laminaria digitata, Laminaria hyperborea, Laminaria saccharina, Eklonia maxima, Sargassum* spp. and mixtures thereof. According to a particular embodiment, said alga is *Ascophyllum nodosum*.

The concentrated algal extract of the present invention may especially have a pH of between 1.5 and 9, preferably between 2 and 7, more preferably between 2.5 and 3.

The concentrated algal extract of the present invention comprises algal intracellular fluid. It may especially comprise one or more compounds chosen from polysaccharides, such as, especially, laminarin and fucans; free and conjugated sugars; polyphenols; mannitol; growth hormones; lipids; proteins; amino acids; vitamins; betaines; sterols; glucuronic acid and mineral salts. According to a particular embodiment, the concentrated algal extract of the present invention comprises laminarin; fucans; lipids; proteins and polyphenols.

According to a particular embodiment, the concentrated algal extract of the present invention may be formulated in a composition comprising said extract and at least one compound chosen from a gelling agent, a thickener, a plant-protection product, a second plant and/or algal extract, minerals, a surfactant, an oil, a preservative, and mixtures thereof.

The concentrated algal extract of the present invention may especially be obtained by the process described below.

The process for preparing a concentrated algal extract according to the present invention comprises the following steps:
  grinding the algae until the cells rupture;
  homogenizing the ground algal material in aqueous solution;
  removing the alginate and the cellulose by flocculation and filtration;
  optionally adjusting the pH of the filtrate;
  concentrating the filtrate to reach a percentage dry matter of between 6 and 100%, preferably between 9 and 70%, more preferentially between 12 and 50%.

Advantageously, the process of the present invention does not contain a step of hydrolysis, in the presence of a reducing agent, for example at a temperature of between 50 and 100° C., for a period of between 4 and 8 h. Indeed, this makes it possible to preserve the compounds of the intracellular fluid of the alga, especially the polysaccharides.

The grinding step especially makes it possible to rupture the algal cell walls, thereby releasing the algal intracellular fluid. The grinding step is preferentially performed on fresh algae, that is to say algae which were harvested within the last 24 h.

The step of homogenizing the ground algal material may especially be carried out by adding water at an amount of from 1 to 21 of water per kg of ground algal material.

The flocculation and filtration step especially makes it possible to remove the residues of the algal cell walls in order to recover the algal intracellular fluid. The residues of the algal cell walls may especially precipitate by flocculation, by adding an acid, especially hydrochloric acid, to the ground algal material. According to a particular embodiment of the present invention, the acid is added so as to obtain a pH of between 1.5 and 4, preferably between 2 and 3.5, more preferentially between 2.5 and 3.

The acidified mixture is then filtered in order to remove the flocs of alginate and of cellulose which are larger than 40 µm.

The pH of the filtrate may optionally be adjusted by adding an acid or a base so as to reach a pH of between 1.5 and 9, preferably between 2 and 7, more preferentially between 2.5 and 3.

The step of concentrating the filtrate may be performed in various ways, such as especially reverse osmosis, water evaporation, algae enrichment or centrifugation.

Reverse osmosis is a membrane separation technique based on a process of selectivity by diffusion. Two algal extracts of different concentrations are placed on either side of a water-permeable membrane. When pressure is applied to the most concentrated algal extract, a portion of the water contained in the most concentrated extract migrates towards the least concentrated extract.

The water may be evaporated especially by heating the algal extract under reduced pressure, for example using a rotary evaporator. The heating may be carried out between 40 and 90° C., preferably between 60 and 80° C.

The algae enrichment may especially be carried out by replacing, in the step of homogenizing the ground algal material of the process according to the invention, the water with an algal suspension obtained by the process according to the invention.

The centrifugation may especially be carried out by subjecting the algal extract to centrifugal force in a machine rotating at high speed.

The step of concentrating the filtrate is preferably carried out by water evaporation.

The concentrated algal extract according to the present invention is advantageously used in agriculture, where it has numerous applications depending on the type of plant to which it is applied and on the period of the plant cycle during which it is used.

The concentrated algal extract of the present invention may especially be used alone or combined with a nutritive, biostimulating or plant-protecting composition.

The plants on which the concentrated algal extract of the present invention may be used are agronomically useful plants, for example vegetable, fruit and cereal crops and ornamental plants. The agronomically useful plants are angiosperms chosen from the group comprising *Apiaceae, Asteraceae, Brassicaceae, Chenopodiaceae, Convolvulaceae, Cucurbitaceae, Fabaceae, Gramineae, Liliaceae, Polygonaceae, Rosaceae, Solanaceae, Poaceae* and *Vitaceae*. According to a particular embodiment, the concentrated algal extract of the present invention is used on tomatoes, rice, soya, fruit trees, vines, wheat or corn.

Thus, when the concentrated algal extract of the present invention is used to promote growth of the plant, said extract may especially be applied by foliar spraying or by application to the soil or root infiltration. The applications may be carried out throughout the growth of the plant, once or several times per week. Very beneficial results have been demonstrated on tomato seedlings and corn seedlings.

When the concentrated algal extract of the present invention is used to stimulate plant emergence and/or to provide a bird-repelling effect, said extract may especially be applied to the seeds before they are planted, or to the young seedlings just after they emerge. The seeds may especially be coated with the concentrated algal extract of the present invention. The coating may for example be carried out by wetting the seeds with said extract and letting them dry, preferably at ambient temperature. The application may be carried out at an amount of from 10 to 120 g, preferably 20 to 110 g, more preferentially 30 to 105 g of concentrated algal extract per 100 kg of seeds. Very beneficial results have been demonstrated on corn seeds.

The coated seed which is a subject of the present invention may especially be prepared as described in the previous paragraph. Coating the seed with the concentrated algal extract of the present invention enables quicker emergence of the plant and makes it more resistant to damping off, compared to uncoated seeds. Moreover, the coated seeds according to the present invention are much less frequently attacked by birds, such as especially crows, pigeons, skylarks, partridges and pheasants, compared to uncoated seeds.

The invention will be described in more detail below using the following examples, given solely by way of illustration.

EXAMPLES

Example 1: Preparation of a Concentrated Algal Extract

An extract of *Ascophyllum nodosum* algae having a percentage dry matter of 5.1%, denoted GOACTIV by the applicant company, is concentrated by water evaporation by heating the extract at 50° C. in a rotary evaporator under (water-pump) vacuum until the percentage dry matter reaches 13%.

Example 2: Application of the Concentrated Algal Extract to Tomato Seedlings

An amount of extract per plant as indicated in the table below is sprayed once a week onto the leaves of tomato seedlings at the 3-leaf stage (3 weeks):

| Algal extract | Comparative: GOACTIV | According to the invention (example 1) |
| --- | --- | --- |
| % dry matter | 5.1% | 13% |
| Amount of extract sprayed per seedling | 0.03 mg | 0.01 mg |

The tomato seedlings are thus treated with comparable amounts of each extract. After 5 weeks of treatment, the tomato seedlings treated with the concentrated algal extract of the present invention (example 1) are taller and bushier than the seedlings treated with the non-concentrated algal extract (GOACTIV).

For comparable amounts of extract applied, the concentrated algal extract of the present invention is therefore more effective at promoting the growth of tomato seedlings than a more diluted extract.

Example 3: Coating Corn Seeds with the Concentrated Algal Extract 100 kg of corn seeds are wetted with 100 g of concentrated algal extract prepared in example 1, in a rotary mixer. The seeds are then left to dry at 20-25° C. for 24 hours.

Example 4: Effect of Coating the Seeds on the Emergence of Corn Seedlings

The coated corn seeds prepared in example 3 are sown on 20 m² plots. A control is carried out with untreated corn seeds. A comparative test is carried out with corn seeds coated with a conventional fungicide comprising 25 g/l of fludioxonil and 9.7 g/l of metalaxyl-M.

Figure 1:
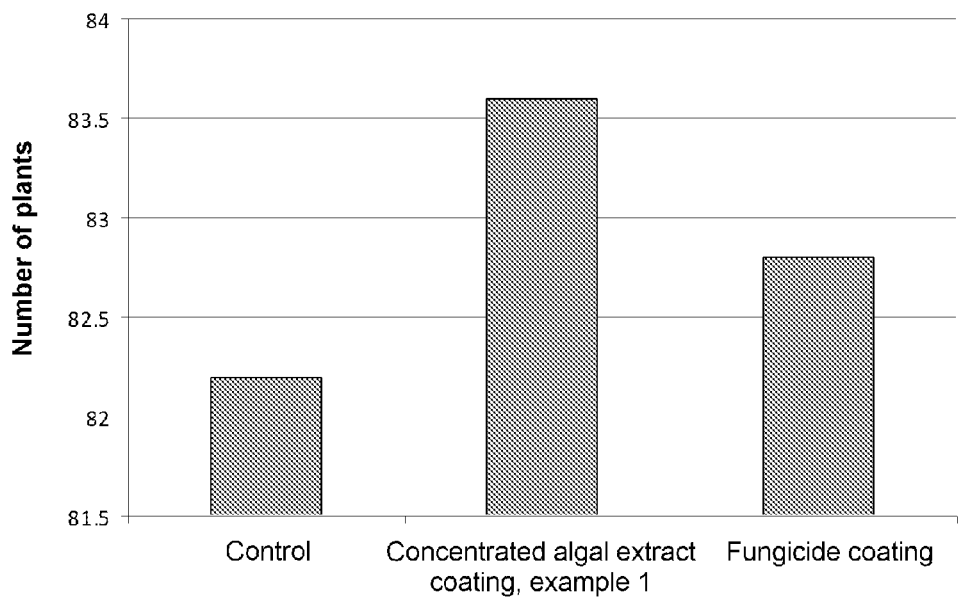
FIG. 1 is a schematic representation of the number of corn seedlings obtained 3 weeks after sewing uncoated corn seeds, corn seeds coated with an algal extract of the present invention or corn seeds coated with a conventional fungicide as described in example 4.

3 weeks after sowing, the number of corn seedlings is counted. The results are presented in FIG. 1. It is observed that emergence of the corn seedlings is favored when the seeds are coated with the concentrated algal extract prepared according to example 1, compared to the uncoated seeds or to the seeds coated with the fungicide.

Example 4 was reproduced and gave similar results.

Example 5: Bird-Repelling Effect of Coating the Seeds

During one of the experiments according to example 4, the field was subjected to a particularly aggressive attack by crows. The birds attack the seeds buried in the soil, which leads to a reduction in the number of healthy corn seedlings relative to the number of seeds planted.

Figure 2:
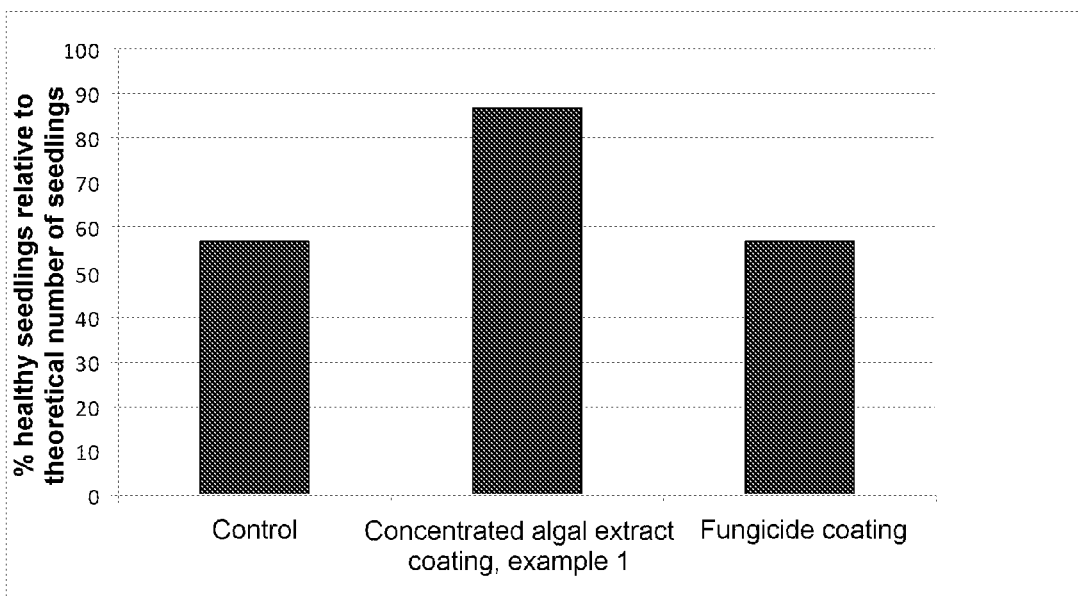
FIG. 2 is a schematic representation of the number of corn seedlings obtained 3 weeks after sewing uncoated corn seeds, corn seeds coated with an algal extract of the present invention or corn seeds coated with a conventional fungicide as described in example 5.

The results are presented in FIG. 2, the values on the y axis being expressed as percentage of healthy corn seedlings relative to the theoretical number of seedlings.

A significant difference was observed in the degree of attack between the control plots or those treated with the fungicide and the plots in which the seeds were coated with the concentrated algal extract of example 1. Thus, the plots which had been sown with seeds treated with the concentrated algal extract of example 1 were relatively spared by the birds.

The concentrated algal extract of the present invention therefore has a bird-repelling effect.

Example 5 was reproduced and gave similar results.

The invention claimed is:

1. A method for repelling birds, consisting of applying a concentrated algal extract by infiltration into the soil, spraying on to the leaves of the plant, applying to a seed before sowing, or applying to the roots of a seedling, before the planting thereof,
wherein the concentrated algal extract is an aqueous extract having a percentage dry matter of between 9 and 70%, and containing 0 to 3% by weight of alginate and 0 to 3% by weight of cellulose relative to the weight of said extract, wherein the concentrated algal extract has a pH of 2 to 7.

2. The method of claim 1, wherein the percentage of dry matter of the concentrated algal extract is between 12 and 50%.

3. The method of claim 1, wherein the algae is *Ascophyllum nodosum, Fucus vesiculosus, Laminaria digitate, Laminaria hyperborea, Laminaria saccharine, Eklonia maxima, Sargassum* spp, or a mixture thereof.

4. The method of claim 1, wherein the concentrated algal extract has a pH of 2.5 to 3.

5. The method of claim 1, wherein the percentage of dry matter of the concentrated algal extract is between 12 and 50%, and the concentrated algal extract contains 2 to 3% by weight of alginate and cellulose relative to the weight of said extract.

* * * * *